(12) United States Patent
Nellen et al.

(10) Patent No.: US 12,034,207 B2
(45) Date of Patent: Jul. 9, 2024

(54) MULTICHANNEL PHOTOCONDUCTIVE TERAHERTZ RECEIVING ANTENNA, RE-CEIVER, TERAHERTZ SYSTEM AND TERAHERTZ METHOD

(71) Applicant: Fraunhofer-Gesellschaft zur Förderung der angewandten Forschung e.V., Munich (DE)

(72) Inventors: Simon Nellen, Berlin (DE); Björn Globisch, Berlin (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 448 days.

(21) Appl. No.: 17/593,654

(22) PCT Filed: Jan. 20, 2020

(86) PCT No.: PCT/EP2020/051315
§ 371 (c)(1),
(2) Date: Sep. 22, 2021

(87) PCT Pub. No.: WO2020/192979
PCT Pub. Date: Oct. 1, 2020

(65) Prior Publication Data
US 2022/0368015 A1   Nov. 17, 2022

(30) Foreign Application Priority Data
Mar. 27, 2019   (EP) .................................... 19165658

(51) Int. Cl.
*H01Q 9/00* (2006.01)
*H01Q 1/38* (2006.01)
(Continued)

(52) U.S. Cl.
CPC ............... *H01Q 1/38* (2013.01); *H01Q 9/285* (2013.01); *H01Q 15/0033* (2013.01); *G01J 11/00* (2013.01)

(58) Field of Classification Search
CPC ....... G01J 11/00; H01Q 1/38; H01Q 15/0033; H01Q 9/285
See application file for complete search history.

(56) References Cited

U.S. PATENT DOCUMENTS

2009/0200472 A1   8/2009   Gregory
2011/0031400 A1*  2/2011   Sartorius ............ G01N 21/3581
                                                   250/338.4

FOREIGN PATENT DOCUMENTS

CN       104538479          4/2015
DE       102010049658 A1    4/2012
(Continued)

OTHER PUBLICATIONS

"Japanese Application Serial No. 2021-555030, Office Action dated Jan. 10, 2023", w English Translation, (dated Jan. 10, 2023).
(Continued)

*Primary Examiner* — Dani Fox
(74) *Attorney, Agent, or Firm* — Schwegman Lundberg & Woessner, P.A.

(57) ABSTRACT

Receiving antenna (1) for terahertz radiation (30), comprising an antenna conductor (2) and a first photoconductor (3) connected to the antenna conductor (2) and activatable by light (9), the first photoconductor (3) allowing, in an activated state, an antenna current (28) flowing through the antenna conductor (2) and the first photoconductor (3), characterized in that the receiving antenna (1) comprises at least one second photoconductor (4) connected to the antenna conductor (2) and activatable by light (9), the second photoconductor connected in parallel with the first photoconductor (3) and, in an activated state, allowing an (Continued)

antenna current (28) flowing through the antenna conductor (2) and the second photoconductor (4), wherein at least one respective high-pass filter (8) is connected between each of the photoconductors (3, 4) and the antenna conductor (2). The invention further relates to a receiver for terahertz radiation (30), a terahertz system, and a method for generating and detecting terahertz radiation (30) using such a terahertz system.

20 Claims, 5 Drawing Sheets

(51) Int. Cl.
*H01Q 9/28* (2006.01)
*H01Q 15/00* (2006.01)
*G01J 11/00* (2006.01)

(56) References Cited

FOREIGN PATENT DOCUMENTS

| DE | 102011015384 A1 | 10/2012 |
|---|---|---|
| GB | 2438215 A | 11/2007 |
| JP | 2011112602 | 6/2011 |
| JP | 2013181790 | 9/2013 |
| JP | 2013540273 | 10/2013 |
| WO | WO-2009036984 A1 | 3/2009 |

OTHER PUBLICATIONS

"International Application Serial No. PCT/EP2020/051315, International Search Report dated Apr. 15, 2020", w/ English Translation, (dated Apr. 15, 2020), 6 pgs.

"International Application Serial No. PCT/EP2020/051315, Written Opinion dated Apr. 15, 2020", (Apr. 15, 2020), 5 pgs.

* cited by examiner

MULTICHANNEL PHOTOCONDUCTIVE TERAHERTZ RECEIVING ANTENNA, RE-CEIVER, TERAHERTZ SYSTEM AND TERAHERTZ METHOD

PRIORITY APPLICATIONS

This application is a U.S. National Stage Filing under 35 U.S.C. § 371 from International Application No. PCT/EP2020/051315, filed on Jan. 20, 2020, and published as WO2020/192979 on Oct. 1, 2020, which claims the benefit of priority to European Application No. 19165658.6, filed on Mar. 27, 2019; the benefit of priority of each of which is hereby claimed herein, and which applications and publication are hereby incorporated herein by reference in their entirety.

The invention relates to a receiving antenna and receiver for terahertz radiation, a terahertz system, and a method for generating and detecting terahertz radiation using such a terahertz system.

A receiving antenna for terahertz radiation of the type that is an object of the present invention includes an antenna conductor and a first photoconductor connected to the antenna conductor and activatable by light, the first photoconductor allowing, in an activated state, an antenna current flowing through the antenna conductor and the first photoconductor.

Receiving antennas of this type, which are also referred to as photoconductive terahertz antennas, are known, for example, from document DE 10 2010 049 658 A1. In order to determine the amplitude and/or the phase of the received terahertz radiation in a given measurement interval, receiving antennas according to the state of the art generally require sequential antenna current measurements in which the timing/phase of the optical excitation is varied relative to the received terahertz radiation. A sequential measurement of at least two such measurement points is necessary even if only one amplitude of the terahertz radiation is to be measured, since this cannot be determined unambiguously without the phase information. Sequential measurements require a corresponding amount of time, which can complicate the application; furthermore, the required adjustability of the timing/phase of the optical excitation increases the complexity of the receiver and the corresponding terahertz methods.

Accordingly, it is an object of the present invention to provide a receiving antenna and a receiver for terahertz radiation as well as a terahertz system with which the reception of terahertz radiation and the analysis of the information contained therein can be performed more quickly and more simply, and accordingly to propose a more rapid and simpler method for generating and detecting terahertz radiation using such a terahertz system.

According to the invention, this object is solved by a receiving antenna for terahertz radiation having the features of claim 1, a receiver for terahertz radiation having the features of claim 5, a terahertz system having the features of claim 10, and a method for generating and detecting terahertz radiation using such a terahertz system having the features of claim 14. Advantageous embodiments, further developments and uses of the invention are provided by way of the features in the dependent claims.

A receiving antenna for terahertz radiation according to the invention comprises, in addition to the first photoconductor mentioned at the beginning, at least one second photoconductor which is likewise connected to the antenna conductor, can be activated by light, is connected in parallel with the first photoconductor and, in an activated state, allows an antenna current to flow through the antenna conductor and the second photoconductor, at least one high-pass filter being connected in each case between each of the photoconductors and the antenna conductor.

By the addition of at least one second photoconductor together with the first photoconductor, simultaneous scanning of a received terahertz signal with several optical signals having different timing/phase, i.e. simultaneous measurement of the corresponding antenna currents, is made possible, which can accelerate the measurement process accordingly compared to the use of only one photoconductor and make the use of a device for adjusting the timing/phase unnecessary. For this purpose, it is sufficient to use two temporally offset optical signals or signal components to excite or activate the at least two photoconductors.

Particular note should be taken of the function of the high-pass filters which, according to the invention, are each connected between the photoconductors and the antenna conductors and, together with the multiple photoconductors, enable the simultaneous measurement of multiple antenna currents. Without the high-pass filters, the photoconductors would be electrically short-circuited to each other, which would make individual measurement of the antenna currents impossible.

Typically, the photoconductors are arranged at a base of the antenna conductor. A base, here, is a part of the antenna conductor to which an alternating voltage caused by the received terahertz radiation is applied during the reception of terahertz radiation, and which can therefore be regarded as a point corresponding to an input impedance or base impedance of the antenna.

An antenna current flows through one of the photoconductors when there is a temporal overlap between the activated state of the photoconductor and the alternating voltage caused by the received terahertz radiation. Accordingly, a measurable component of the antenna current may be an alternating current with the frequency $f_z$, also called intermediate frequency, which corresponds to a difference frequency $f_z=|f_{THz}-f_{LO}|$ between a frequency of the terahertz radiation called terahertz frequency $f_{THz}$ and a frequency $f_{LO}$, also called local oscillator frequency, of an optical excitation of the respective photoconductor. Accordingly, a signal modulated onto, for instance, the amplitude and/or phase of the terahertz radiation is demodulated by the receiving antenna. In the special case that $f_{THz}$ and $f_{LO}$ are identical, the antenna current is a direct current.

The edge frequencies of the high-pass filters may be chosen in such a way that terahertz frequencies are transmitted, but lower frequencies are not transmitted. The edge frequency may accordingly lie between $f_z$ and $f_{THz}$. Terahertz frequencies $f_{THz}$ may be frequencies in a frequency range from 0.05 THz to 20 THz, typically in a frequency range from 0.1 THz to 10 THz. Accordingly, at least one of the high-pass filters may have, for example, a transmission edge between 50 GHz and 100 GHz.

Between each of the photoconductors and the at least one high-pass filter, which is connected between said photoconductor and the antenna conductor, in each case a contact may be provided for picking up a measurement signal. Such a measurement signal may correspond to a low-frequency component of the antenna current, i.e. to a component of the antenna current which has frequencies below a certain edge frequency, in particular below the transmission edge of the high-pass filter.

Any material or combination of materials whose electrical conductivity changes, typically increases, when absorbing electromagnetic radiation, for example visible, ultraviolet or infrared light, i.e. an optical signal, may be used to implement the photoconductor. This is also referred to as optical excitation or activation of the photoconductor. At least one of the photoconductors may include an active layer disposed on a substrate. For example, such a photoconductor may be realized using III-V compound semiconductors. For example, the active layer may be realized using the material system In—Ga—Al—As—P, and the substrate may consist of InP or GaAs.

The antenna conductor may be a patterned metal layer disposed on a substrate. In particular, this makes it possible to implement the receiving antenna as an optoelectronic chip on which the optical and electronic elements of the receiving antenna are integrated, which enables a robust and compact design. The shape of the antenna conductor may be a bowtie shape, i.e. a two-part conductor shape comprising two triangular or trapezoidal conductor segments arranged in mirror symmetry and tapering towards the axis of symmetry, or an arrangement of rectangular strips. However, the antenna conductor may also be realized in three-dimensional geometries, for example as a horn antenna.

The high-pass filters may also be implemented in various ways. At least one of the high pass filters may be or comprise a capacitance connected in series with one of the photoconductors. The capacitance may be implemented, for example, by a dielectric layer between a conductor surface connected to one of the photoconductors and a conductor surface connected to the antenna conductor. This embodiment may advantageously be integrated on an optoelectronic chip, provided that the latter is used as the design of the antenna.

However, this is not the only option. For instance, at least one of the high-pass filters may also comprise—alternatively or additionally—an inductance connected between one of the photoconductors and a reference potential. The inductance may be, for example, a conductor track arranged in a meandering pattern. This embodiment may also advantageously be integrated on an optoelectronic chip, provided that the latter is used as the design of the antenna.

The plurality of photoconductors may be arranged at equivalent locations, i.e., close enough to each other that at least approximately the same electric field exists at the locations of all the photoconductors. This is the case if the distance between the photoconductors is smaller than the smallest terahertz wavelength to be detected. A typical smallest terahertz wavelength to be detected may be, for example, 300 µm or 50 µm, corresponding to a bandwidth of 1 THz or 5 THz. The first photoconductor and the second photoconductor may have a distance of less than 300 µm, preferably a distance of less than 200 µm, less than 100 µm, or less than 50 µm.

The proposed receiver for terahertz radiation, in which a receiving antenna of the type described herein unfolds its advantages, comprises a receiving antenna for terahertz radiation according to the invention and at least one light source configured to generate at least one light signal for activating the first photoconductor and the at least one second photoconductor of the receiving antenna, wherein the at least one light source is optically coupled to the first photoconductor and/or the at least one second photoconductor of the receiving antenna for applying light from the at least one light signal to the first photoconductor and the second photoconductor.

The at least one light signal may be modulated in time, frequency space, or phase. For example, it may be given by at least one beat signal or by preferably multiple light pulses.

The receiver may further comprise at least one beam splitter arranged to split the light signal generated by the light source into a first component and a second component, the light source being optically coupled to the first photoconductor and the at least one second photoconductor of the receiving antenna for applying the first component of the light signal to the first photoconductor and for applying the second component of the light signal to the second photoconductor so that the second component of the light signal reaches the second photoconductor with a defined phase shift and/or transit-time difference with respect to the first component of the light signal reaching the first photoconductor.

The photoconductors may therefore be activated by different components of the same light signal formed by at least one beam splitter. This light signal may in turn be formed as a beat signal by superimposing several light signals by means of at least one coupler; it is irrelevant whether the coupler(s) are arranged in front of or behind the beam splitter(s). Even in the latter case, if the beat signal is formed only after the division of two light signals into two components each by superimposing one of the components of both light signals with one of two couplers each, the light signals leaving the two couplers are thus referred to as two components of the same light signal, namely of the same beat signal.

In some embodiments of the receiver, the at least one light source may be connected to the photoconductor using a planar integrated waveguide chip. The waveguide material of such a chip may be, for example, a polymer, a nitride, a phosphide, or a glass. If this is the case, the light source, the receiving antenna and the integrated waveguide may also be arranged on a common substrate, thus achieving a robust and compact design. The integrated waveguide design has the advantage of achieving smaller dimensions of the light coupling to the photoconductors than with an optical fiber, which is particularly important when the distance of the photoconductors is less than 50 µm.

The aforementioned phase shift and/or transit-time difference of the components of the light signal reaching the photoconductors, or a corresponding shift between several light signals that can be used to activate the different photoconductors, ensures that the simultaneously scanned components of the received terahertz radiation are also different with respect to their timing/phase. This makes it possible to determine the amplitude and/or phase of the received terahertz radiation—even simultaneously—without sequential measurements.

This makes it possible, among other things, to use the receiver described herein for the in-phase quadrature (IQ) method, which is widely used in the field of communications technology, thus making the quadrature amplitude modulation (QAM) method available for terahertz communications, for example. This is not possible with receivers known from the prior art, since only the receiving antenna proposed here offers the possibility of simultaneously scanning two components of the signal. In QAM communication, information is impressed onto the signal at the transmitter end, whereby both the amplitude and the phase of the carrier signal are modulated. This allows symbols for digital communication to be defined in a two-dimensional grid. The two components are referred to as the in-phase component and the quadrature component (I and Q components). The I and Q components are determined on the receiver side from two simultaneous measurements of the signal with a defined phase shift, typically of 90° ($\pi/2$).

The phase shift and/or transit-time difference may be realized, for example, by optical path lengths of different lengths in the optical coupling of the respective light signals or components of the light signal to the photoconductors. This may be realized by different optical fiber lengths or, in the case of the integrated waveguide chip design, by different lengths or different refractive indices of the respective waveguides.

Advantageously, the light source may be a laser light source, wherein the laser light source may include one or more lasers, for example diode lasers.

The at least one light source may comprise at least two continuous wave lasers that are detuned or detunable with respect to one another for generating at least one optical beat signal and/or a pulse laser for generating light pulses.

The generation of a beat signal, which is then split into two components with a known phase shift, is particularly advantageous for the use of the receiver as an IQ receiver as outlined above, for example in communications. Such use of the receiver to measure the properties of a sample may also be advantageous in sensor technology. In this context, it is sometimes of interest to measure the optical thickness of an object by means of phase shifts, which may comprise several phase periods. In order to be able to determine this unambiguously, the terahertz frequency is detuned over a certain range according to the state of the art. The receiver proposed herein can also accelerate this method by detecting at least two beat signals of different frequency simultaneously.

The use of a pulse laser also results in advantageous applications of the receiver in sensor technology. Such applications involve, for example, transit-time measurements, such as determining the thickness of an object by measuring the timing/phase of reflections from the front and back of the object. In the prior art, the timing/phase of the scanning pulse is adjusted over a range corresponding to at least the single or double optical thickness of the object, for example by means of mechanical delay lines. With the receiver described here, for example, two sampling pulses may be pre-set in the expected timing/phase relative to each other, which means that the transit-time difference has to be adjusted only over a much smaller range. This in turn saves time during the measurement.

The receiver may further comprise an adjustable optical delay unit, configured to make the phase shift and/or transit-time difference of the second component of the light signal at the second photoconductor with respect to the first component of the light signal at the first photoconductor adjustable.

Such an adjustable delay unit may be implemented, for example, as a mechanical delay line or as an electro-optical element. As described above, an adjustable delay unit is advantageous, for example, when the receiver is used in sensing.

The receiver may comprise an analysis unit configured to analyze a first measurement signal, corresponding to the antenna current flowing through the first photoconductor or, more precisely, a low-frequency component of this antenna current, and a second measurement signal, corresponding to the antenna current flowing through the second photoconductor or, more precisely, a low-frequency component of this antenna current, in order to determine an amplitude and/or a phase of a received terahertz radiation using the defined phase shift and/or transit-time difference.

By means of this analysis, the information contained in the terahertz radiation, which may have been imprinted onto the radiation by the transmitter or a sample, is made available for further use.

The measurement signals may be generated by measuring the currents through the photoconductors, for example by means of transimpedance amplifiers (TIA). Such TIAs are particularly suitable as low-noise amplifiers for small currents; other current measuring devices may also be used.

The proposed terahertz system, comprising a transmitter configured to generate terahertz radiation and a receiver for terahertz radiation of the type described above, configured to receive the terahertz radiation generated by means of the transmitter, constitutes an advantageous application of the described receiver or receiving antenna.

The cooperation of the transmitter and receiver of the terahertz system allows the advantageous applications outlined above to be realized. For this purpose, the system may be designed in various ways according to the respective application.

The transmitter may include an antenna conductor and a photosensitive element optically coupled to the antenna conductor such that, in an activated state and when a bias voltage is applied, it causes an antenna current to flow through the antenna conductor and the photosensitive element.

Thus, the already known advantages of a photoconductive terahertz transmitting antenna may be combined with those of the photoconductive multichannel receiver described here.

The at least one light source of the receiver may then further be optically coupled to the photosensitive element of the transmitter, such that the photosensitive element of the transmitter may be activated by a further component of the light signal generated by the light source.

This allows sending and receiving to be set up coherently. Such a terahertz system is particularly suitable for taking measurements on a sample, whereby the sample is placed between the transmitter and the receiver and imprints information onto a transmitted terahertz radiation, which, after appropriate analysis, allows conclusions to be drawn about properties of the sample.

Regardless of how the transmitter is activated, the transmitter may include a modulator adapted to encode information in the terahertz radiation generated by the transmitter by phase modulation or amplitude modulation.

The modulation may be realized advantageously in the optical range.

The embodiment realized in this way is particularly suitable for communication, especially in conjunction with a receiver set up as an IQ receiver. In this case, if a photoconductive antenna is also used as the transmitter as described above, the excitation light for the photosensitive element of the transmitter does not necessarily have to come from the same light source as the excitation light for the photoconductors of the receiving antenna of the receiver, since for digital communication with QAM in each case only the change in the signal between discrete states within certain time intervals has to be detected. For this purpose, it is sufficient to use excitation signals with essentially the same frequency on the transmitter and receiver side, so that sufficient coherence of the light signals is given in the relevant time intervals.

The modulator may be realized by a photoconductive transmitter antenna in connection with an adjustable optical delay unit.

A method of generating and detecting terahertz radiation using a terahertz system according to the invention includes the steps of:

generating a terahertz signal by means of the transmitter of the terahertz system;

receiving the terahertz signal generated by the transmitter by means of the receiver of the terahertz system, the receiving comprising the steps of:

activating the first photoconductor of the receiving antenna of the receiver by the first component of the light signal generated by the at least one light source of the receiver, activating the at least one second photoconductor of the receiving antenna of the receiver by the second component of the light signal generated by the at least one light source of the receiver, simultaneously measuring the first measurement signal corresponding to the antenna current flowing through the first photoconductor or, more precisely, a low-frequency component of this antenna current, and the second measurement signal corresponding to the antenna current flowing through the second photoconductor or, more precisely, a low-frequency component of this antenna current, while activating the first photoconductor and the second photoconductor;

and determining the amplitude and/or phase of the received terahertz signal from the first measurement signal and the second measurement signal using the defined phase shift and/or transit-time difference between the first and second components of the light signal.

In the last step, the analysis unit of the receiver may be used to determine the amplitude and/or the phase. With the proposed method, it becomes possible to make the above-described advantages of the receiving antenna, the receiver and the terahertz system usable for communication or sensor technology in a procedural manner.

In some examples of the method, the first component of the light signal generated by the at least one light source of the receiver and the second component of the light signal generated by the light source of the receiver may be optical beats or light pulses.

When using optical beats, the method is particularly suitable for communication using QAM or for sensor technology, as explained above. When using light pulses, the method is particularly suitable for transit-time measurements.

Further, if the transmitter comprises a modulator, the proposed method may comprise the steps of: encoding information in the terahertz signal generated by the transmitter of the terahertz system by modulating the phase and/or the amplitude of the terahertz signal by means of the modulator and registering the information applied to the terahertz signal.

In this form, the method is particularly well suited for communication.

In such a method, further, when encoding information in the terahertz signal generated by the transmitter of the terahertz system, both the phase and the amplitude of the terahertz signal may be modulated using quadrature amplitude modulation and, when registering the information encoded in the terahertz signal, the first measurement signal and the second measurement signal may be used as the in-phase component and the quadrature component.

The method is thus particularly well suited for communication. In this context, the method enables a high bandwidth and correspondingly a high data transmission rate by exploiting a frequency range of the electromagnetic spectrum that is still little developed for such applications.

A method according to the invention may also further comprise the steps of: arranging a sample in a beam path between the transmitter and the receiver of the terahertz system, a component of the terahertz signal generated by the transmitter being subjected, by interaction with the sample, to an altered phase and/or amplitude and/or a second transit-time difference, detection of the phase and/or amplitude altered by interaction with the sample and/or a second transit time difference caused by the sample of the terahertz signal received by the receiver, and determination of one or more properties of the sample from the changed phase and/or amplitude and/or frequency and/or second transit time difference thus detected.

In this form, the method opens up the possibility of determining properties of the sample which are accessible to terahertz measurements, particularly quickly and easily.

Embodiment of the invention will be explained hereinafter with reference to FIG. 1A to FIG. 6. The figures show, schematically.

Figure 1A:
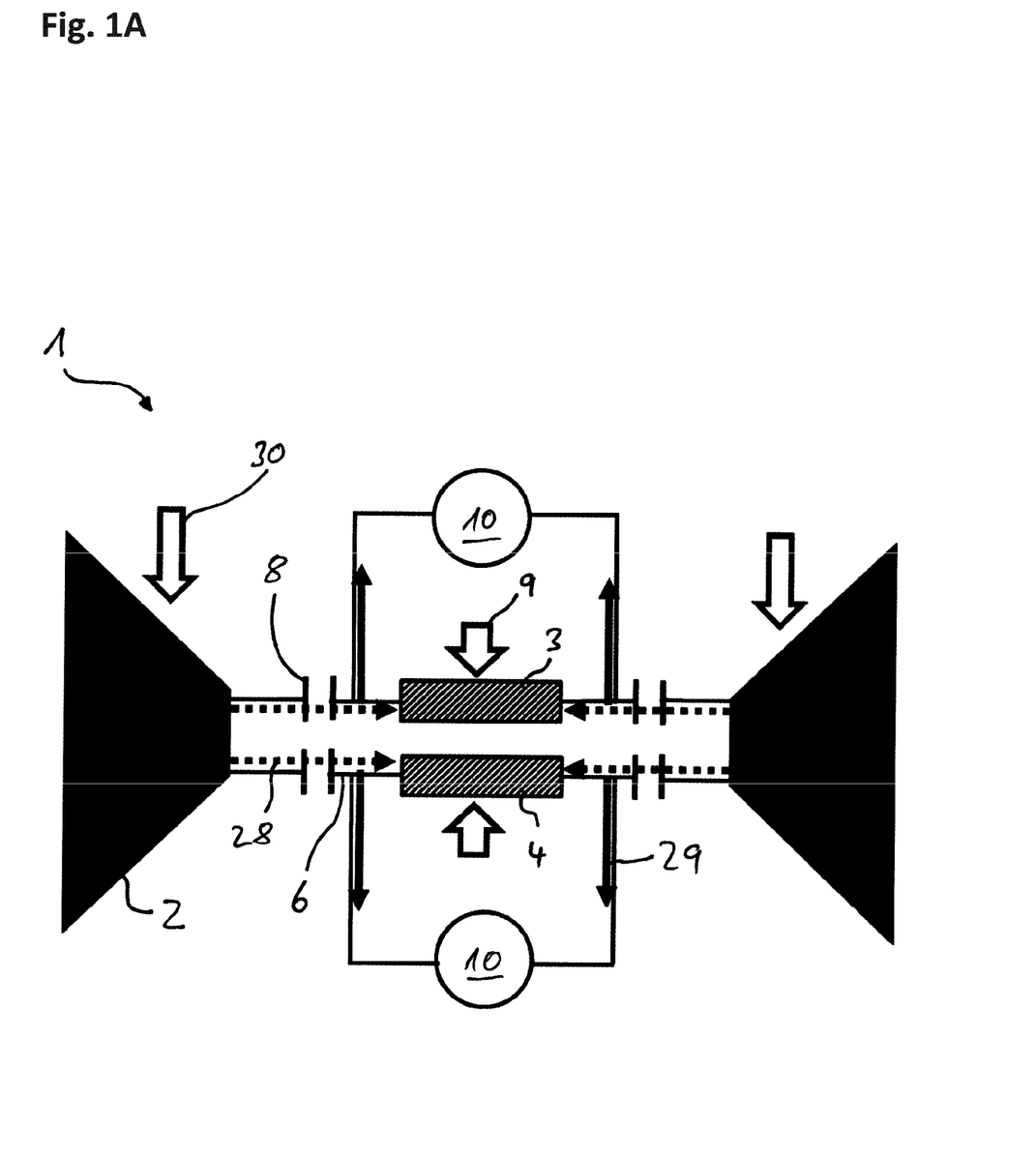
FIG. 1A a receiving antenna for terahertz radiation.
Figure 1B:
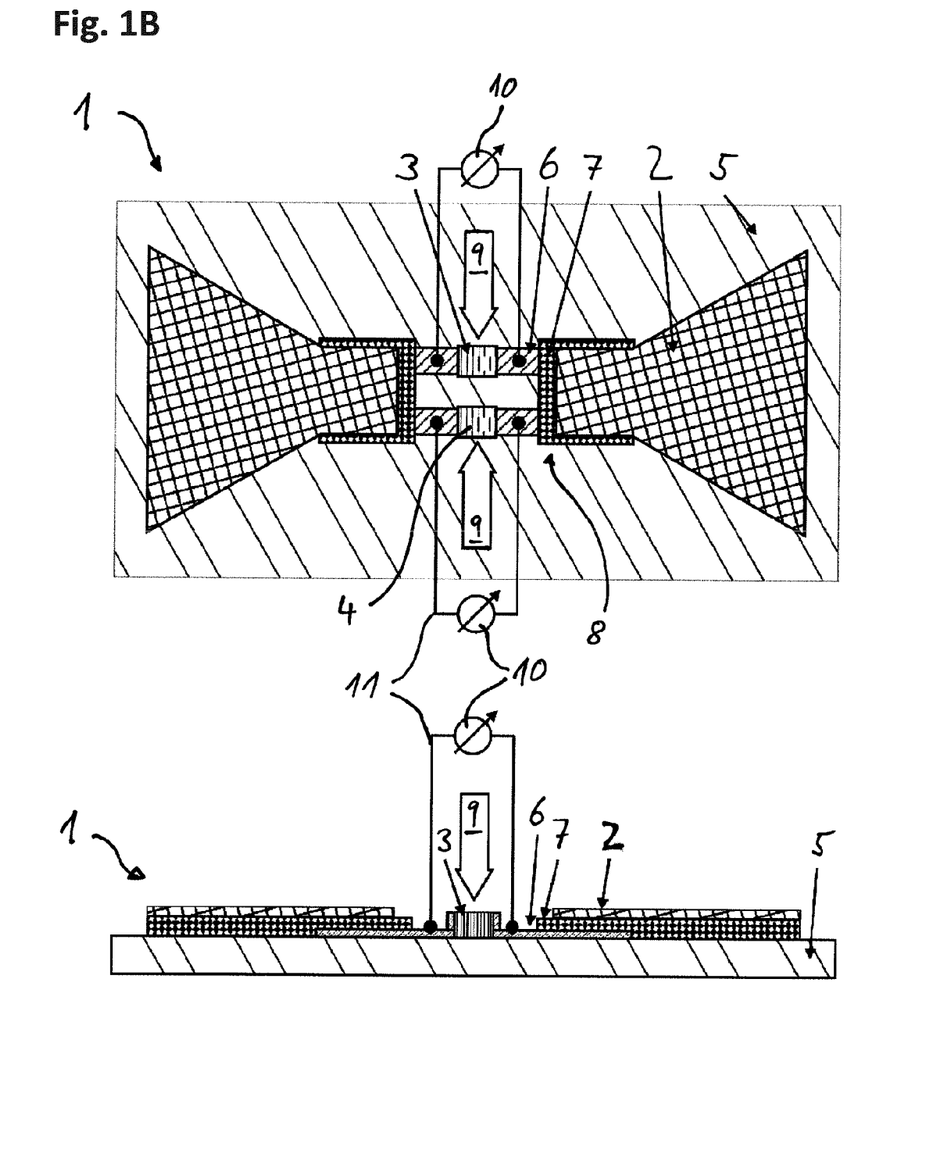
FIG. 1B a top view and a side view of a receiving antenna of the type shown in FIG. 1A, the antenna being implemented as an optoelectronic chip, FIG. 2 a detailed view of a receiver for terahertz radiation with a receiving antenna of the type shown in FIG. 1B, FIG. 3 a detailed view of a receiver for terahertz radiation with a receiving antenna of the type shown in FIG. 1A or 1B, FIG. 4 a homodyne terahertz system with continuous wave lasers comprising an IQ receiver of the type outlined in FIG. 3, FIG. 5 a homodyne terahertz system with a pulsed laser comprising a further example of a receiver for terahertz radiation with a receiving antenna of the type shown in FIG. 1A or 1B, FIG. 6 a heterodyne terahertz system with a receiver as in FIG. 4, but with a different embodiment of a transmitter.

The receiving antenna 1 for terahertz radiation 30 outlined in FIG. 1A, like the specific embodiment of FIG. 1B, comprises a two-part antenna conductor 2 and a first photoconductor 3 connected to the antenna conductor 2 and activatable by light 9, which in an activated state allows an antenna current 28 flowing through the antenna conductor 2 and the first photoconductor 3.

Furthermore, the receiving antenna 1 comprises a second photoconductor 4 also connected to the antenna conductor 2 and activatable by light 9, the second photoconductor 4 connected in parallel with the first photoconductor 3 and allowing an antenna current 28 flowing through the antenna conductor 2 and the second photoconductor 4 in an activated state. A respective high-pass filter 8 is connected between each of the photoconductors 3, 4 and each of the two parts of the two-part antenna conductor 2 by means of electrical contacts 6.

By means of the contacts 6, each of the photoconductors 3, 4 is connected to a respective measuring amplifier 10. The contacting means 6 enable a respective measurement signal, such as a low-frequency component 29 of the antenna current 28 flowing through the respective photoconductor 3, 4, to be picked up by means of the measurement amplifiers 10.

Recurring features are provided with the same reference signs in the figures. The receiving antenna 1 shown in FIG. 1B is implemented as an optoelectronic chip on a substrate 5 consisting of InP or GaAs.

The following are arranged on the substrate 5: the first photoconductor 3 and the second photoconductor 4; the contacts 6, which are electrically connected to the photoconductors 3 and 4; the two-part antenna conductor 2, designed as a metallic layer and separated from the electrical contacts 6 by a dielectric layer 7, the dielectric layer 7 forming, together with an overlying part of the antenna conductor 2 and a respective one of the contacts 6, in each case a capacitor which acts as a high-pass filter 8 between the antenna conductor 2 and the respective photoconductor 3 or 4. The two photoconductors 3 and 4 are connected in parallel in this arrangement.

The capacitors, formed by the dielectric layer 7, the contacts 6 and the antenna conductor 2, are dimensioned in such a way that a transmission edge between 50 GHz and 100 GHz is obtained for the high-pass filter 8.

The photoconductors 3 and 4 are implemented as epitaxial layers using the material system In—Ga—Al—As—P. The distance between the photoconductors 3 and 4 is less than 50 µm. The photoconductors 3 and 4 are activatable by light 9 (indicated as arrows), allowing a respective antenna current 28 flowing through the antenna conductor 2 and an activated photoconductor 3 or 4 in an activated state. The photoconductors 3 and 4 are arranged such that there is a distance between them of less than 50 µm, possibly even less than 20 µm or 10 µm.

The receiving antenna 1 further comprises two measurement amplifiers 10, each of the measurement amplifiers being connected to the contacts 6 of one of the photoconductors 3 and 4 via leads 11. The measurement amplifier 10 connected to the first photoconductor 3 is arranged to detect a first measurement signal corresponding to the low frequency component of the antenna current flowing through the first photoconductor 3; the measurement amplifier 10 connected to the second photoconductor 4 is arranged to detect a second measurement signal corresponding to the low frequency component of the antenna current flowing through the second photoconductor 4. Transimpedance amplifiers (TIAs), which are characterized by their good suitability for measuring small currents, are used as measurement amplifiers.

In another embodiment of the receiving antenna 1 (not shown), the dielectric layer 7 may be omitted, thus the contacts 6 may be electrically connected directly to the antenna conductor 2. The high-pass filters 8 can then be implemented by conductor paths shaped in a meandering pattern as inductors, which branch off from the contacts 6 and are connected to a reference potential.

Figure 4:
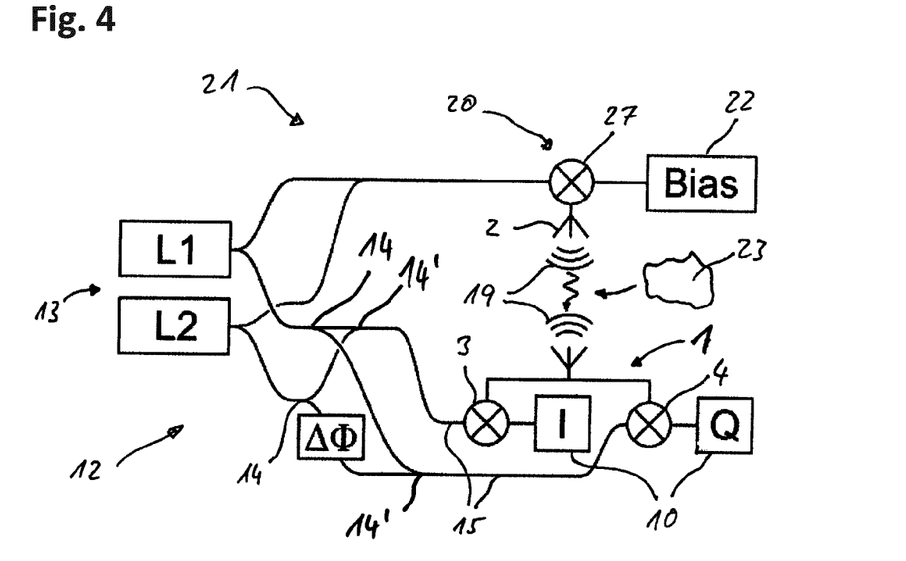

An application of the receiving antenna of FIG. 1A or 1B is shown in FIG. 4, which illustrates a receiver 12 for terahertz radiation in the context of a terahertz system 21. In addition to the receiving antenna 1, the receiver 12 comprises a light source 13, two beam splitters 14 and two couplers 14'. The light source 13 is configured to generate a light signal to activate the first photoconductor 3 and the second photoconductor 4.

The light source 13 includes two continuous wave lasers of the same kind, L1 and L2, which are detuned or detunable with respect to each other such that an optical beat signal can be generated by combining light from the two lasers L1 and L2.

For this purpose, the continuous wave lasers L1 and L2 are coupled to beam splitters 14. Light components of the light generated by the lasers L1 and L2 intended for activating the receiving antenna are first divided into two components each by means of the beam splitters 14. One of these components is subjected to a phase shift ΔΦ. By means of the couplers 14', one of the components originating from laser L1 and one of the components originating from laser L2 are now superimposed, whereby two separate components of the same beat signal generated by means of the two lasers L1 and L2 of the light source are formed.

In this or a similar way, a first component of a light signal may be supplied to the first photoconductor 3 and a second component of the same light signal, which is subjected to a defined phase shift and/or transit time difference with respect to the first component, can be directed to the second photoconductor 4. Through waveguides 15, a first one of these components of the beat signal is directed to the first photoconductor 3 and a second one of these components is guided to the second photoconductor 4.

Figure 2:
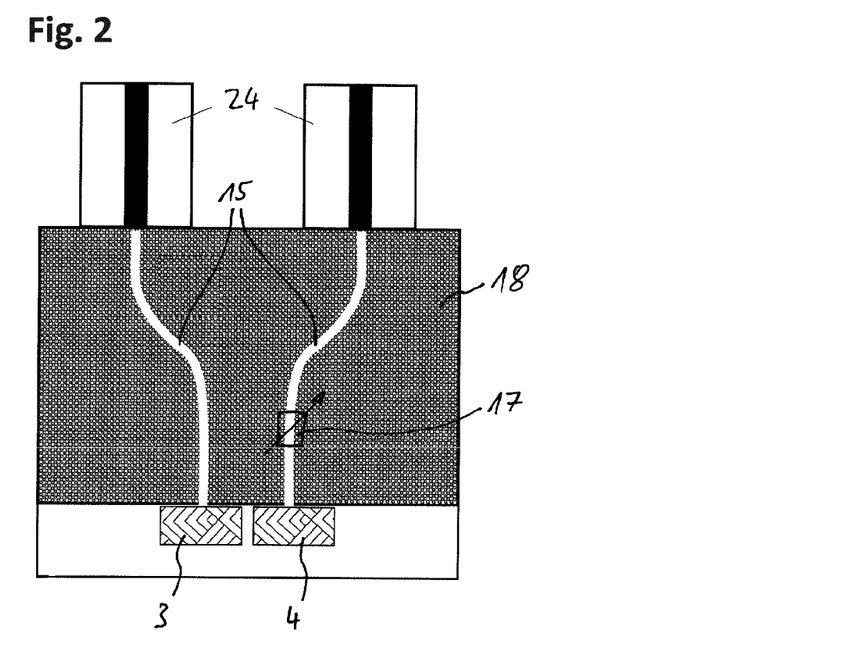

As shown in FIG. 2, the waveguides 15 may be implemented by a planar integrated waveguide chip 18. In this embodiment, the light signal components are coupled into the waveguides 15 via optical fibers 24. That waveguide 15 or optical fiber 24 which directs the second component of the light signal to the second photoconductor 4 is configured, by virtue of a length difference with respect to the waveguide 15 or optical fiber 24 which directs the first component of the light signal to the first photoconductor 3, to apply a fixed phase shift of 90° to the second component of the light signal. The integrated waveguide chip 18 allows the dimension of the fibers 24 to be matched to the dimension and distance of the photoconductors 3 and 4.

The receiver 12 further comprises a digital processor (not shown) as an analysis unit, which analyses the measurement signals detected by the measurement amplifiers 10 and determines therefrom—by exploiting the known phase shift—the amplitude and the phase of the received terahertz radiation.

In the example shown in FIG. 2, the integrated waveguide chip 18 is a separate element. Instead, the waveguides 15 may also be integrated on the substrate 5 of the optoelectronic chip of the receiving antenna 1 in the same way as the light source 13.

Further, as shown in FIG. 2, the receiver 12 may include an adjustable optical delay unit 17 integrated into one of the waveguides 15 and configured to apply an adjustable phase shift to the second component of the light signal.

Figure 5:
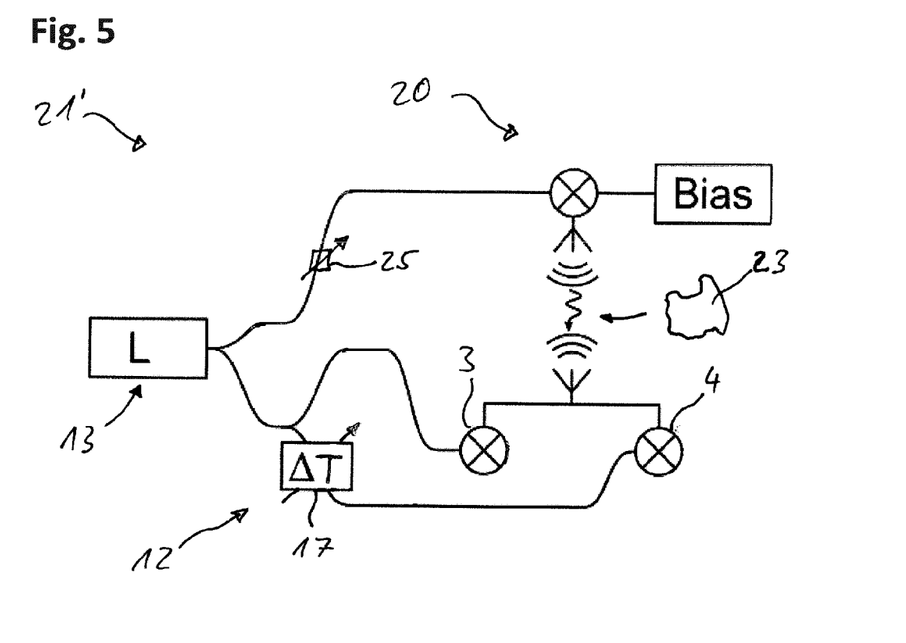

In a further embodiment of the receiver 12, illustrated in FIG. 5 in the context of a further terahertz system 21', the two continuous wave lasers L1 and L2 are replaced by a pulse laser L arranged to generate an optical light pulse. This receiver 12 also comprises an adjustable optical delay unit 17, the latter being configured to apply an adjustable transit-time difference to the second component of the light signal.

Figure 3:
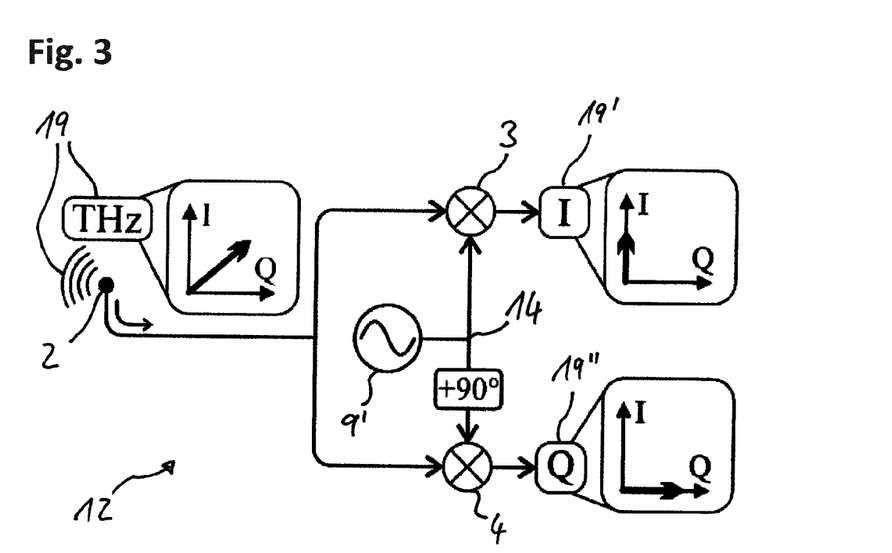

The receiver 12 shown in FIG. 4 as part of the terahertz system 21 may be used as an IQ receiver, as described further above. The corresponding operating principle is shown in FIG. 3. As described above, the antenna conductor 2 of the receiver 12 is connected to the first photoconductor 3 and the second photoconductor 4 via the high pass filters 8 (not shown here). These are activated by the periodic beat signal 9', the second component of the beat signal 9' having a phase shift of 90° relative to the first component. The light 9 for exciting or activating the photoconductors 3 and 4 illustrated in FIGS. 1A and 1B corresponds in this case to the two components of the beat signal 9'. The terahertz signal 19, which at a given frequency is determined by its phase and amplitude, can be decomposed in a pointer diagram into an I-component 19' and a Q-component 19" orthogonal thereto, as shown. Due to the phase shift of 90° between the two components of the beat signal 9', the currents flowing through the corresponding photoconductors 3 and 4 can be identified with the components 19' and 19", which allows the phase and amplitude of the terahertz signal 19 to be determined.

The terahertz system 21 shown in FIG. 4 also includes a transmitter 20 configured to generate terahertz radiation, the receiver 12 being arranged to receive terahertz radiation generated by means of the transmitter 20.

The transmitter 20 includes an antenna conductor 2 and a photosensitive element 27 optically coupled to the antenna conductor 2, wherein the photosensitive element 27, in an activated state and when a bias voltage is applied, causes an antenna current to flow through the antenna conductor 2 and the photosensitive element 27. Thus, the transmitter 20 is substantially similar in structure to the receiver 12, with the transmitter 20 having only one photosensitive element 27. The bias voltage is supplied by a voltage source 22.

In this embodiment, the transmitter 20 and receiver 12 are further fed by the same light source 13, that is, the light source 13 of the receiver 12 is optically coupled to the photosensitive element 27 of the transmitter 20 and is arranged to generate a light signal for activating the photosensitive element 27 of the transmitter 20. For this reason, the terahertz system 21 is also referred to as a homodyne system.

At the receiver side, the optical beat signal 9' is split by the beam splitter 14 into the first component and the second component, which are guided by the waveguides 15 to the photoconductors 3 and 4, the second component reaching the second photoconductor 4 having the phase shift ΔΦ with respect to the first component reaching the first photoconductor 3.

The terahertz system 21 enables a method for generating and detecting terahertz radiation using the terahertz system 21. Here, a terahertz signal 19 is generated by means of the transmitter 20. For this purpose, a bias voltage is applied to the antenna conductor 2 of the transmitter 20 by means of the voltage source 22. The photosensitive element 27 of the transmitter 20 is activated by the light signal generated by the light source 13, causing an antenna current to flow through the photosensitive element 27 as an alternating current with the period of the beat signal, resulting in the radiation of the terahertz signal 19 by the antenna conductor 2.

The terahertz signal 19 generated by means of the transmitter 20 is received by means of the receiver 12. To this end, the first photoconductor 3 of the receiving antenna 1 of the receiver 12 is activated by the first component of the light signal generated by the light source 13 of the receiver 12. The second photoconductor 4 of the receiving antenna 2 of the receiver 12 is activated by the second component of the light signal generated by the light source 13 of the receiver 12, the second component having a phase shift ΔCP Φ 90° with respect to the first component. Simultaneously with the activation of the photoconductors 3 and 4, the first measurement signal corresponding to the low-frequency component of the antenna current flowing through the first photoconductor 3 and the second measurement signal corresponding to the low-frequency component of the antenna current flowing through the second photoconductor 4 are measured by means of the measurement amplifiers 10.

By exploiting the known phase shift ΔΦ, the amplitude and phase of the received terahertz signal 19 is determined from the first measurement signal and the second measurement signal using the analysis unit.

An exemplary application of the described method is particularly suitable for the analysis of a sample 23. The sample 23 is arranged in a beam path between the transmitter 20 and the receiver 12 (indicated by an arrow in FIG. 4). A component of the terahertz signal 19 generated by the transmitter 20 is subjected to an altered phase and/or amplitude by interacting with the sample 23.

The altered phase/and or amplitude of the terahertz signal 19 due to interacting with the sample 23 is detected by the analysis unit. From the phase and/or amplitude thus detected, one or more properties of the sample 23 are determined. Depending on the placement of the sample 23, terahertz radiation transmitted or reflected by the sample 23 may be detected.

The terahertz system 21' shown in FIG. 5 corresponds in its structure in large parts to the terahertz system 21 in FIG. 4. Therefore, only the distinguishing features from the terahertz system 21 of FIG. 4 are described here. This terahertz system 21' is also a homodyne system, i.e. the transmitter 20 and receiver 12 are fed by the same light source 13. Instead of the two continuous wave lasers L1 and L2, the light source 13 of the receiver 12 here comprises the pulsed laser L, which is set up to generate optical light pulses. When reaching the second photoconductor 4, the second component of the light pulse exhibits the transit time difference ΔT with respect to the first component reaching the first photoconductor 3.

In addition, a second adjustable optical delay unit 25 is optically connected between the light source 13 and the photosensitive element 27 of the transmitter 20, which allows adjustment of the relative timing/phase of the transmission and sampling pulses.

The terahertz system 21' shown in FIG. 5 is suitable for a further example of the method described above. Also in this example, a sample 23 is arranged in a beam path between the transmitter 20 and the receiver 12 (indicated by arrow). The sample 23 may be arranged such that a transmitted component of the terahertz signal 19 impinges on the receiver 12, but may also be arranged such that at least a reflected component of the terahertz signal 19 impinges on the receiver 12, wherein at least a component of the terahertz signal 19 impinging on the receiver 12 is subjected to a second transit-time difference by interacting with the sample 23.

The second transit-time difference is detected by the analysis unit, for which purpose, in some method embodiments, the adjustable optical delay unit 17 and/or the second adjustable optical delay unit 25 is adjusted. A property or properties of the sample 23, such as a thickness, is determined from the second time-of-flight difference thus detected and/or an attenuation of the terahertz radiation caused by the sample 23.

Figure 6:
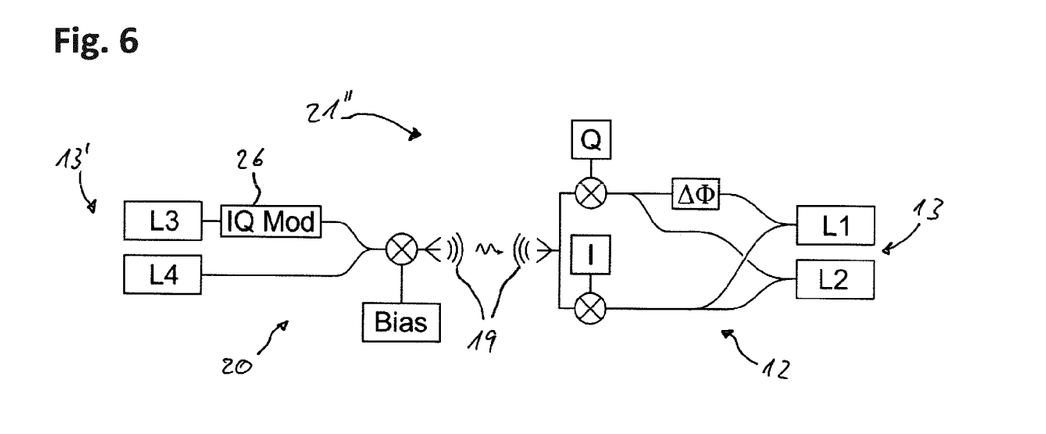

FIG. 6 shows a further terahertz system 21", implemented as a heterodyne system, i.e. in which the transmitter 20 and receiver 12 are fed by different light sources 13' and 13. The receiver 12, which is fed by the light source 13, is here completely analogous to the receiver 12 in FIG. 4, to the description of which reference is therefore made. In the terahertz system, the transmitter 20 is fed by the light source 13', wherein the light source 13' comprises two continuous wave lasers L3 and L4 of the same kind, which are detuned with respect to each other such that an optical beat signal can be generated by combining light signals from the two lasers L3 and L4, wherein the beat frequency is identical to the frequency of the beat generated by combining the two lasers L1 and L2.

However, the beat frequency of the optical beat signal generated by combining the light signals of the two lasers L3 and L4 need not be equal to the beat frequency of the optical beat signal generated by combining the light signals of the two lasers L1 and L2. Two beat signals of different beat frequencies may be used instead. However, in this case, the difference of the two beat frequencies or—in case of additional modulation—the sum of the aforementioned difference and the modulation frequency—should be lower than the transmission edge of the high pass filters.

The transmitter 20 further comprises a modulator 26 adapted to encode information in a generated terahertz radiation by phase modulation and/or amplitude modulation. To this end, the modulator 26 is configured as an adjustable optical delay unit which applies an adjustable phase difference to the light signal generated by the laser L3 before combining it with the light signal generated by the laser L4. Additionally or alternatively, the modulator 26 may also be configured to modulate the amplitude of the generated terahertz radiation, for example by modulating the laser power of the lasers L3 and L4.

A further example of the method described above with reference to FIG. 4 is advantageously made possible using the heterodyne terahertz system 21" shown in FIG. 6, this method being particularly suitable for communication. Here, the described method is modified in that information is encoded in the terahertz signal 19 generated by means of the transmitter 20 of the terahertz system 21" by modulating the phase and/or the amplitude of the terahertz signal 19 by means of the modulator 26, and in that the information encoded in the terahertz signal 19 is detected.

A particular embodiment of this method is specifically configured for communication using the IQ method described above. In this case, when encoding information in the terahertz signal 19 generated by means of the transmitter 20 of the terahertz system 21", both the phase and the amplitude of the terahertz signal 19 are modulated using quadrature amplitude modulation; when detecting the information encoded in the terahertz signal 19, the first measurement signal and the second measurement signal are used as the in-phase component and the quadrature component.

| List of reference signs | |
|---|---|
| 1 | Receiving antenna |
| 2 | Antenna conductor |
| 3 | First photoconductor |
| 4 | Second photoconductor |
| 5 | Substrate |
| 6 | Contact |
| 7 | dielectric layer |
| 8 | High-pass filter |
| 9 | Light |
| 9' | Beat signal |
| 10 | Measurement amplifier |
| 11 | Leads |
| 12 | Receiver |
| 13 | Light source |
| 14 | Beam splitter |
| 14' | Coupler |
| 15 | Waveguide |
| 17 | Adjustable optical delay unit |
| L1, L2 | continuous wave laser |
| L | Pulsed laser |
| 18 | Integrated waveguide chip |
| 19 | Terahertz signal |
| 19' | I-component |
| 19" | Q-Component |
| 20 | Transmitter |
| 21, 21', 21" | Terahertz system |
| 22 | Voltage source |
| 23 | Sample |
| 24 | Optical fibers |
| 25 | Second adjustable optical delay unit |
| 26 | Modulator |
| 27 | Photosensitive element |
| 28 | Antenna current |
| 29 | Low-frequency component |
| 30 | Terahertz radiation |

The invention claimed is:

1. A receiving antenna for terahertz radiation, the receiving antenna comprising:
    an antenna conductor; and
    a first photoconductor connected to the antenna conductor, wherein the first photoconductor is activatable by light, wherein the first photoconductor when, in an activated state, allows an antenna current to flow through the antenna conductor and the first photoconductor;
    wherein the receiving antenna comprises at least one second photoconductor connected to the antenna conductor, wherein the at least one second photoconductor is activatable by light, wherein the at least one second photoconductor is connected in parallel with the first photoconductor and when the at least one second photoconductor is in an activated state, allows the antenna current to flow through the antenna conductor and the second photoconductor, and wherein at least one high-pass filter is connected between at least one of: the first photoconductor and the antenna conductor, or the at least one second photoconductor and the antenna conductor.

2. The receiving antenna according to claim 1, further comprising:
    a contact for detecting a measurement signal located between the at least one high pass filter and at least one of the first photoconductor or the at least one second photoconductor.

3. The receiving antenna according to claim 1, wherein at least one of the at least one high pass filter includes at least one of: a capacitor connected in series with at least one of the first photoconductor or the at least one second photoconductor, or an inductor connected between at least one of the first photoconductor or the at least one second photoconductor and a reference potential.

4. The receiving antenna according to claim 1, wherein at least one of the at least one high pass filter has a transmission edge between 50 GHz and 100 GHz, inclusive and/or wherein the first photoconductor and the second photoconductor have a distance of less than 300 μm therebetween.

5. A receiver for terahertz radiation, comprising:
    a receiving antenna for terahertz radiation, the receiving antenna comprising:
        an antenna conductor; and
        a first photoconductor connected to the antenna conductor, wherein the first photoconductor is activatable by light, wherein the first photoconductor when, in an activated state, allows an antenna current to flow through the antenna conductor and the first photoconductor;
        wherein the receiving antenna comprises at least one second photoconductor connected to the antenna conductor, wherein the at least one second photoconductor is activatable by light, wherein the at least one second photoconductor is connected in parallel with the first photoconductor and when the at least one second photoconductor is in an activated state, allows the antenna current to flow through the antenna conductor and the second photoconductor, and wherein at least one high-pass filter is connected between at least one of: the first photoconductor and the antenna conductor, or the at least one second photoconductor and the antenna conductor; and
    at least one light source to generate at least one light signal for activating the first photoconductor and the at least one second photoconductor of the receiving antenna, wherein the at least one light source is optically coupled to at least one of the first photoconductor or to the at least one second photoconductor of the receiving antenna for applying light from the at least one light signal to the first photoconductor and the second photoconductor.

6. The receiver according to claim 5, further comprising: at least one beam splitter configurable to split the light signal generated by the light source into a first component and a second component such as to allow the first component of the light signal to be applied to the first photoconductor and to allow the second component of the light signal to be applied to the second photoconductor, so that the second component of the light signal reaches the second photoconductor with at least one of a defined phase shift or a defined transit-time difference with respect to the first component of the light signal reaching the first photoconductor.

7. The receiver according to claim 6, further comprising: an adjustable optical delay unit, configurable to make at least one of the defined phase shift or the defined transit-time difference of the second component of the light signal at the at least one second photoconductor adjustable with respect to the first component of the light signal at the first photoconductor.

8. The receiver according to claim 5, wherein the at least one light source comprises at least one of: at least two mutually detuned or detunable continuous wave lasers for generating at least one optical beat signal or a pulsed laser for generating a light pulse.

9. The receiver according to claim 5, further comprising: an analysis unit configurable to analyze a first measurement signal, corresponding to a low-frequency component of the antenna current flowing through the first photoconductor, and a second measurement signal, corresponding to a low-frequency component of the antenna current flowing through the second photoconductor, for determining at least one of an amplitude or a phase of a received terahertz radiation.

10. A terahertz system comprising:
a transmitter to generate terahertz radiation; and
a receiver for terahertz radiation, to receive the terahertz radiation generated by the transmitter, the receiver comprising:
    a receiving antenna comprising:
        an antenna conductor; and
        a first photoconductor connected to the antenna conductor, wherein the first photoconductor is activatable by light, wherein the first photoconductor when, in an activated state, allows an antenna current to flow through the antenna conductor and the first photoconductor;
    wherein the receiving antenna comprises at least one second photoconductor connected to the antenna conductor, wherein the at least one second photoconductor is activatable by light, wherein the at least one second photoconductor is connected in parallel with the first photoconductor and when the at least one second photoconductor is in an activated state, allows the antenna current to flow through the antenna conductor and the second photoconductor, and wherein at least one high-pass filter is connected between at least one of: the first photoconductor and the antenna conductor, or the at least one second photoconductor and the antenna conductor; and
    at least one light source to generate at least one light signal for activating the first photoconductor and the at least one second photoconductor of the receiving antenna, wherein the at least one light source is optically coupled to at least one of the first photoconductor or to the at least one second photoconductor of the receiving antenna for applying light from the at least one light signal to the first photoconductor and the second photoconductor.

11. The terahertz system according to claim 10, wherein the transmitter comprises an antenna conductor and a photosensitive element, the photosensitive element being optically coupled to the antenna conductor such as to cause, in an activated state and when a bias voltage is applied, an antenna current flowing through the antenna conductor and the photosensitive element.

12. The terahertz system according to claim 11, wherein the at least one light source of the receiver is further optically coupled to the photosensitive element of the transmitter such that the photosensitive element of the transmitter is activatable by a component of the light signal generated by the light source.

13. The terahertz system according to claim 10, wherein the transmitter comprises a modulator configurable to encode, by at least one of phase modulation or amplitude modulation, information in the terahertz radiation generated by the transmitter.

14. A method of generating and detecting terahertz radiation, the method comprising:
generating a terahertz signal using a transmitter;
receiving the terahertz signal generated by the transmitter by a receiver
activating a first photoconductor of a receiving antenna of the receiver by a first component of a light signal generated by at least one light source of the receiver;
activating at least one second photoconductor of the receiving antenna of the receiver by a second component of the light signal generated by the at least one light source of the receiver;
concurrently measuring a first measurement signal corresponding to a low-frequency component of an antenna current flowing through the first photoconductor and a second measurement signal corresponding to a low-frequency component of the antenna current flowing through the at least one second photoconductor while the first photoconductor and the at least one second photoconductor are activated;
and
determining at least one of an amplitude or a phase of the received terahertz signal from the first measurement signal and the second measurement signal using at least one of a defined phase shift or a defined transit-time difference between the first component and the second component of the light signal.

15. The method according to claim 14 further comprising:
encoding information in the terahertz signal generated by the transmitter by modulating at least one of the phase or the amplitude of the terahertz signal using a modulator, and
registering the information encoded in the terahertz signal.

16. The method according to claim 15, wherein, in encoding information in the terahertz signal generated by the transmitter, both the phase and the amplitude of the terahertz signal are modulated using quadrature amplitude modulation and wherein, in registering the information encoded in the terahertz signal, the first measurement signal and the second measurement signal are respectively used as a corresponding in-phase component and a quadrature component.

17. The method according to claim 14, further comprising:
arranging a sample in a beam path between the transmitter and the receiver, wherein a component of the terahertz signal generated by the transmitter is subjected, by interacting with the sample, to at least one of an altered phase, an altered amplitude, or a second transit-time difference,
detecting at least one of the altered phase, the altered amplitude, or the second transit-time difference of the terahertz signal received by the receiver caused by the interacting with the sample, and
determining one or more properties of the sample from at least one of the altered phase, the altered amplitude and/or a frequency, or the second transit-time difference so detected.

18. The method according to claim 14, wherein the receiver includes at least one beam splitter to split a light signal generated by the light source into the first component and the second component to allow the first component of the light signal to be applied to the first photoconductor and to allow the second component of the light signal to be applied to the at least one second photoconductor.

19. The method according to claim 18, wherein the second component of the light signal reaches the at least one second photoconductor with at least one of the defined phase shift or the defined transit time difference with respect to the first component of the light signal reaching the first photoconductor.

20. The method according to claim 19, wherein the receiver includes an adjustable optical delay unit configurable to make at least one of the defined phase shift or the defined transit time difference of the second component of the light signal at the at least one second photoconductor adjustable with respect to the first component of the light signal at the first photoconductor.

* * * * *